United States Patent
Edge et al.

(10) Patent No.: US 10,154,470 B2
(45) Date of Patent: *Dec. 11, 2018

(54) CONTROL PLANE LOCATION SOLUTION TO SUPPORT WIRELESS ACCESS

(71) Applicant: QUALCOMM Incorporated, San Diego, CA (US)

(72) Inventors: Stephen William Edge, Escondido, CA (US); Kirk Allan Burroughs, Alamo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/596,697

(22) Filed: May 16, 2017

(65) Prior Publication Data
US 2017/0251448 A1    Aug. 31, 2017

Related U.S. Application Data

(63) Continuation of application No. 12/541,841, filed on Aug. 14, 2009, now Pat. No. 9,693,184.
(Continued)

(51) Int. Cl.
*H04W 64/00* (2009.01)
*H04L 29/08* (2006.01)
(Continued)

(52) U.S. Cl.
CPC ............ *H04W 64/00* (2013.01); *H04L 67/18* (2013.01); *H04W 4/02* (2013.01); *H04W 4/20* (2013.01); *H04W 4/90* (2018.02); *H04W 76/50* (2018.02)

(58) Field of Classification Search
CPC ......... H04W 4/02; H04W 4/028; H04W 4/20; H04W 4/22; H04W 36/32; H04W 64/00;
(Continued)

(56) References Cited

U.S. PATENT DOCUMENTS 5,570,411 A    10/1996   Sicher
6,313,787 B1 *  11/2001   King .................. G01S 19/05
                                                   342/357.42
(Continued)

FOREIGN PATENT DOCUMENTS

CN        101132542 A    2/2008
KR    20090003135 A    1/2009
(Continued)

OTHER PUBLICATIONS

3GPP TS 23.271 V7.0.0 (Sep. 2007) 3rd Generation Partnership Project; Technical Specification Group Services and System Aspects; Functional Stage 2 description of Location Services (LCS) (Release 7).*
(Continued)

*Primary Examiner* — Michael Y Mapa
(74) *Attorney, Agent, or Firm* — Holland & Hart LLP

(57) ABSTRACT

Techniques for supporting a control plane solution for location services and positioning are described. In an aspect, an Evolved Serving Mobile Location Center (E-SMLC) may communicate with a Mobility Management Entity (MME) to support location services and positioning for a UE. In one design, the E-SMLC may receive a location request from the MME, perform a positioning procedure with the UE in response to the location request, and send a location response to the MME after completing the positioning procedure. For a UE-assisted or UE-based positioning procedure, the E-SMLC may send a downlink positioning message to the UE via the MME and may receive an uplink positioning message from the UE via the MME. For a network-based positioning procedure, the E-SMLC may send a network positioning request message to an eNB via the MME and may receive a network positioning response message from the eNB via the MME.

20 Claims, 11 Drawing Sheets

Related U.S. Application Data

(60) Provisional application No. 61/142,556, filed on Jan. 5, 2009, provisional application No. 61/089,795, filed on Aug. 18, 2008.

(51) Int. Cl.
  *H04W 4/02* (2018.01)
  *H04W 4/20* (2018.01)
  *H04W 4/90* (2018.01)
  *H04W 76/50* (2018.01)

(58) Field of Classification Search
  CPC .... H04W 76/007; H04W 88/00; H04L 67/18; G01S 5/00; G01S 5/0226; G01S 5/0236; G01S 5/0257; G01S 5/0263
  USPC ................ 455/404.2, 414.2, 440, 456.1–457
  See application file for complete search history.

(56) References Cited

U.S. PATENT DOCUMENTS

| | | | |
|---|---|---|---|
| 6,424,638 | B1 | 7/2002 | Ray et al. |
| 7,054,283 | B2 | 5/2006 | Carlsson et al. |
| 8,942,660 | B2 | 1/2015 | Edge et al. |
| 2001/0014604 | A1 | 8/2001 | Kingdon et al. |
| 2002/0110096 | A1* | 8/2002 | Carlsson ................ H04W 4/02 370/328 |
| 2003/0035544 | A1 | 2/2003 | Herle et al. |
| 2005/0148340 | A1 | 7/2005 | Guyot |
| 2005/0182565 | A1 | 8/2005 | Bourdeaut |
| 2006/0014517 | A1 | 1/2006 | Barclay et al. |
| 2006/0046714 | A1 | 3/2006 | Kalavade |
| 2006/0258352 | A1 | 11/2006 | Ishii |
| 2006/0258369 | A1 | 11/2006 | Burroughs et al. |
| 2006/0293066 | A1 | 12/2006 | Edge et al. |
| 2007/0004378 | A1 | 1/2007 | Muhonen et al. |
| 2007/0004429 | A1 | 1/2007 | Edge et al. |
| 2007/0060097 | A1 | 3/2007 | Edge et al. |
| 2007/0135089 | A1 | 6/2007 | Edge et al. |
| 2007/0171861 | A1 | 7/2007 | Akhtar |
| 2007/0178913 | A1 | 8/2007 | Niemenmaa et al. |
| 2007/0207806 | A1 | 9/2007 | Shaheen |
| 2007/0254625 | A1 | 11/2007 | Edge |
| 2007/0287448 | A1 | 12/2007 | Kim et al. |
| 2008/0267153 | A1 | 10/2008 | Mukherjee et al. |
| 2010/0041418 | A1 | 2/2010 | Edge et al. |
| 2010/0202407 | A1 | 8/2010 | Edge |
| 2010/0311386 | A1 | 12/2010 | Edge et al. |
| 2011/0051658 | A1 | 3/2011 | Jin et al. |
| 2011/0165856 | A1 | 7/2011 | You et al. |

FOREIGN PATENT DOCUMENTS

| | | |
|---|---|---|
| WO | WO-2007002303 A1 | 1/2007 |
| WO | WO-2007016695 A2 | 2/2007 |
| WO | WO-2007035736 A2 | 3/2007 |
| WO | WO-2008028402 A1 | 3/2008 |

OTHER PUBLICATIONS

3GPP TS 23.271 V7.0.0 (Sep. 2007) 3rd Generation Partnership Project; Technical Specification Group Services and System Aspects; Functional Stage 2 description of Location Services (LCS) (Release 7) (Year: 2007).*
3GPP, "3rd Generation Partnership Project; Technical Specification Group Services and System Aspects; General Packet Radio Service (GPRS) Enhancements for Evolved Universal Terrestrial Radio Access Network (E-UTRAN) Access (Release 8)," 3GPP Technical Specification, Jun. 2008, 182 pgs, 3GPP TS 23.401, V8.2.0, 3rd Generation Partnership Project, Sophia-Antipolis Valbonne, France.
3GPP, "3rd Generation Partnership Project; Technical Specification Group Services and System Aspects; Functional Stage 2 Description of Location Services (LCS) (Release 7)," 3GPP Technical Specification, Sep. 2007, 146 pgs, 3GPP TS 23.271, V7.9.0, XP050363506, 3rd Generation Partnership Project, Sophia-Antipolis Valbonne, France.
3GPP, "3rd Generation Partnership Project; Technical Specification Group Services and System Aspects; SR VCC Support for IMS Emergency Calls (Release 9)," 3GPP Technical Report, Jun. 2009, 14 pgs, 3GPP TR 23.870, V9.0.0, XP050364047, 3rd Generation Partnership Project, Sophia-Antipolis Valbonne, France.
3GPP, "3rd Generation Partnership Project; Technical Specification Group Services and System Aspects; Evaluation of LCS Control Plane Solutions for EPS (Release 9)," 3GPP Technical Report, Jan. 2009, 62 pgs, 3GPP TR 23.891, V.0.3.0, XP050380737, 3rd Generation Partnership Project, Sophia-Antipolis Valbonne, France.
Alcatel-Lucent et al., "TR 23.891 Inter-MME Location Continuity," 3GPP TSG SA WG2 Meeting #70, TD S2-090682 (was 0071), Phoenix, AZ, USA, Jan. 12-16, 2009, 7 pgs., XP050333147, 3rd Generation Partnership Project.
EPO, Supplementary European Search Report, EP App. No. EP14159456, dated May 9, 2014, European Patent Office, Munich, DE, 10 pgs.
EPO, Supplementary European Search Report, EP App. No. EP14159468, dated May 9, 2014, European Patent Office, Munich, DE, 7 pgs.
EPO, Supplementary European Search Report, EP App. No. EP14159475, dated May 9, 2014, European Patent Office, Munich, DE, 11 pgs.
Huawei, "Location Service Support by E-UTRAN," 3GPP TSG-RAN WG2 Meeting #66bis, R2-093906, Los Angeles, USA, Jun. 29-Jul. 3, 2009, 6 pgs., XP050352101, 3rd Generation Partnership Project.
ISA/EP, International Search Report and Written Opinion of the International Searching Authority, Int'l Application No. PCT/US2010/023670, dated May 11, 2010, European Patent Office, Rijswijk, NL, 15 pgs.
ISA/EP, International Search Report and Written Opinion of the International Searching Authority, Int'l Application No. PCT/US2009/054096, dated Dec. 29, 2009, European Patent Office, Rijswijk, NL, 11 pgs.
ISA/EP, International Search Report and Written Opinion of the International Searching Authority, Int'l Application No. PCT/US2010/037494, dated Mar. 18, 2011, European Patent Office, Rijswijk, NL, 23 pgs.
ITU-R Ad Hoc, "Proposed Update of Section 5.3.1 Toward Rev 8 of M.1457," TSG-RAN Meeting #38, RP-070965, Cancun, Nov. 27-30, 2007, 34 pgs.
Nokia Siemens Networks et al., "Location Continuity in SRVCC," SA WG2 Temporary Document, 3GPP TSG SA WG2 Meeting #71, TD S2-091157, Budapest, Hungary, Feb. 16-20, 2009, 6 pgs., XP050333559, 3rd Generation Partnership Project.
Nokia Siemens Networks et al., "SRVCC Functionality for Emergency Calls (Change Request)," 3GPP TSG-SA2 Meeting #73, S2-093438, Tallinn, Estonia, May 11-15, 2009, 19 pgs., XP050346518, 3rd Generation Partnership Project.
Nokia Siemens Networks et al., "SRVCC Functionality for Emergency Calls (Change Request)," 3GPP TSG-SA2 Meeting #73, S2-093756, Tallinn, Estonia, May 11-15, 2009, 29 pgs., 3rd Generation Partnership Project.
ISA/EPO, Partial International Search Report of the International Searching Authority, Int'l App. No. PCT/US2010/037494, dated Oct. 13, 2010, European Patent Office, Rijswijk, NL, 4pgs.
Qualcomm Europe, "LCS Control Plane Alternatives for EPS," 3GPP TSG SA WG2 Meeting #67, TD 52-085599, Sophia Antipolis, France, Aug. 25-29, 2008, 25 pgs., XP002557776, 3rd Generation Partnership Project.
Qualcomm Europe et al., "Details on Architectural Alternative #2 for LCS Control Plane Solutions for EPS," SA WG2 Temporary Document, 3GPP TSG SA WG2 Meeting #69, TD S2-088298 (e-mail revision 1 of S2-088148) Revision of S2-087392, Miami, Florida, USA, Nov. 17-21, 2008, 10 pgs., XP050629278, 3rd Generation Partnership Project.
Qualcomm Europe (for RAN2), "LS on Architecture and Work Split for Positioning in LTE," 3GPP Draft; 3GPP TSG RAN WG2

(56) References Cited

OTHER PUBLICATIONS

Meeting #66bis, R2-094074, Los Angeles, CA, USA, Jun. 29-Jul. 3, 2009, 1 pg., XP050352219, 3rd Generation Partnership Project.

Qualcomm Europe, "LCS Control Plane Alternatives for EPS," SA WG2 Temporary Document, 3GPP TSG SA WG2 Meeting #67, TD S2-085599, Sophia Antipolis, France, Aug. 25-29, 2008, 26 pgs., XP050628859, 3rd Generation Partnership Project.

Qualcomm Europe, "Location Continuity for Handoff of Emergency Calls", SA WG2 Temporary Document, 3GPP TSG SA WG2 Meeting #71, TD S2-091450, Revision of S2-090913, Budapest, Hungary, Feb. 16-20, 2009, 8 pgs., 3rd Generation Partnership Project.

Qualcomm Europe, "Location Continuity for SRVCC Support of Emergency Calls," 3GPP TSG SA WG2 Meeting #71, TD S2-091451, Revision of S2-090914, Budapest, Hungary, Feb. 16-20, 2009, 11 pgs., 3rd Generation Partnership Project.

Qualcomm Europe, "SRVCC Functionality for Emergency Calls (Change Request)," 3GPP TSG-SA2 Meeting #73, S2-093755, Revision of S2-093574, Tallinn, Estonia, May 11-15, 2009, 17 pgs., XP050346787, 3rd Generation Partnership Project.

Taiwan Search Report, TW098127765, Taiwan Intellectual Property Office, dated Aug. 16, 2012, 1 pg.

Taiwan Search Report, TW099104029, Taiwan Intellectual Property Office, dated Sep. 9, 2013, 1 pg.

Taiwan Search Report, TW099118424, Taiwan Intellectual Property Office, dated Mar. 12, 2013, 1 pg.

TSG RAN, "Proposed Update of Section 5.3.1 Toward Rev 8 of M.1457," TSG-RAN Meeting #38, RP-071026, Cancun, Nov. 27-30, 2007, 34 pgs.

Beming P., et al., "LTE-SAE Architecture and Performance", Ericsson Review (INCL. ON), Telefonaktiebolaget L M Ericsson, SE, No. 3, Jan. 1, 2007, pp. 98-104, XP001507749, ISSN: 0014-0171.

Snaptrack: "GSM LCS Overview Assisted GPS Perspective", 3GPP LCS Workshop, LCS 010003, Jan. 11, 2011, XP050655180, 30 Pages.

\* cited by examiner

US 10,154,470 B2

CONTROL PLANE LOCATION SOLUTION TO SUPPORT WIRELESS ACCESS

This application is a Continuation application of U.S. patent application Ser. No. 12/541,841, filed Aug. 14, 2009, titled "Control Plane Location Solution to Support Wireless Access", which claims priority to Provisional U.S. Application Ser. No. 61/089,795, filed Aug. 18, 2008, and Provisional U.S. Application Ser. No. 61/142,556, filed Jan. 5, 2009, each being titled "Control Plane Location Solution to Support LTE Wireless Access," assigned to the assignee hereof, and expressly incorporated herein for all purposes by reference.

BACKGROUND

I. Field

The present disclosure relates generally to communication, and more specifically to techniques for supporting location services (LCS) for user equipments (UEs).

II. Background

It is often desirable, and sometimes necessary, to know the location of a UE, e.g., a cellular phone. The terms "location" and "position" are synonymous and are used interchangeably herein. For example, an LCS client may desire to know the location of the UE and may communicate with a location center in order to request the location of the UE. The location center and the UE may then exchange messages, as necessary, to obtain a location estimate for the UE. The location center may then return the location estimate to the LCS client.

A wireless network may support location services and positioning. Positioning refers to a functionality that determines a geographical location of a target UE. Location services refer to any services based on or related to location information, which may include any information related to the location of a UE, e.g., measurements, a location estimate, etc.

The wireless network may implement a control plane solution or a user plane solution to support location services and positioning. In a control plane solution, messages supporting location services and positioning may be carried as part of signaling transferred between various network entities, typically with network-specific protocols, interfaces, and signaling messages. In a user plane solution, messages supporting location services and positioning may be carried as part of data transferred between various network entities, typically with standard data protocols such as Transmission Control Protocol (TCP) and Internet Protocol (IP). A control plane solution may be preferred since it may enable network-based positioning, which may not be supported by a user plane solution. Furthermore, a control plane solution may be more compatible with existing solutions, may be usable with any UE, and may be more reliable and/or more accurate.

SUMMARY

Techniques for supporting a control plane solution for location services and positioning are described herein. In an aspect, an Evolved Serving Mobile Location Center (E-SMLC) may communicate with a Mobility Management Entity (MME) to support location services and positioning for a UE. In one design, the E-SMLC may receive a location request from the MME and may perform a positioning procedure with the UE in response to the location request. The E-SMLC may send a location response to the MME after completing the positioning procedure.

In one design, for a UE-assisted or UE-based positioning procedure, the E-SMLC may send a downlink positioning message to the MME for forwarding to the UE. The E-SMLC may thereafter receive an uplink positioning message sent by the UE and forwarded by the MME. The downlink positioning message may request location information (e.g., measurements, a location estimate, etc.) from the UE and may include assistance data for the UE, a request for UE capabilities, etc. The uplink positioning message may include the requested location information. The downlink and uplink positioning messages may be encapsulated in other messages at lower layer.

In another design, for a network-based positioning procedure, the E-SMLC may send a network positioning request message to the MME for forwarding to an evolved Node B (eNB). The E-SMLC may thereafter receive a network positioning response message sent by the eNB and forwarded by the MME. The network positioning request message may request location information from the eNB, and the network positioning response message may include the requested location information. The network positioning request and response messages may be encapsulated in other messages at lower layer.

Various aspects and features of the disclosure are described in further detail below.

DETAILED DESCRIPTION

The control plane solution described herein may be used for various wireless networks, which may implement various radio technologies. For example, the control plane solution may be used for a Long Term Evolution (LTE) network that may implement Evolved Universal Terrestrial Radio Access (E-UTRA). LTE is part of 3GPP Evolved Packet System (EPS). LTE, E-UTRA and EPS are described in documents from an organization named "3rd Generation Partnership Project" (3GPP). The control plane solution may also be used for other wireless networks and other radio technologies.

The control plane solution described herein may also be supported with various network architectures. Each network architecture may be associated with a set of network entities that may be coupled in a specific manner and may communicate via specific interfaces to provide various services. Some exemplary network architectures are described below.

Figure 1:
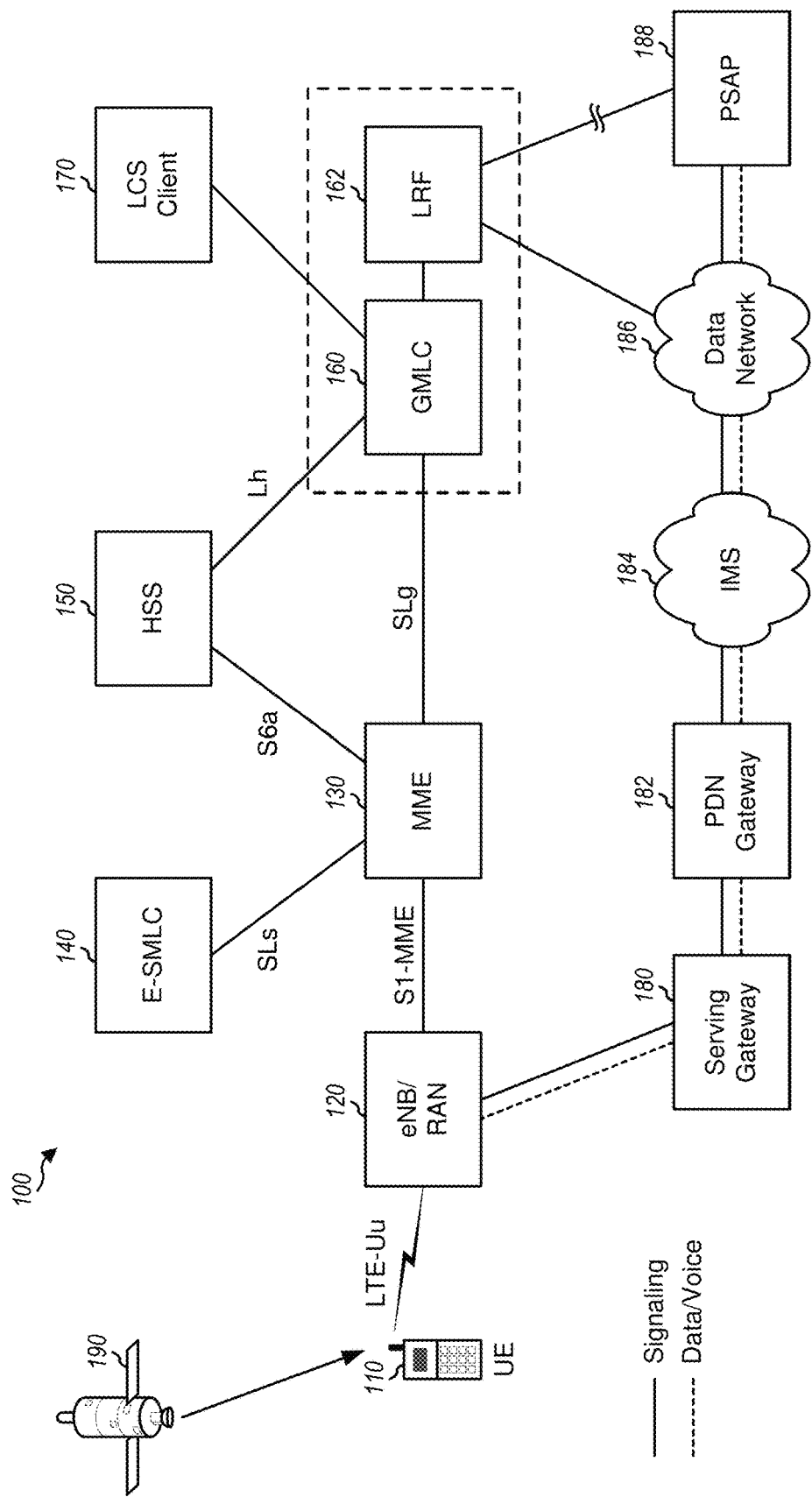
FIGS. 1, 2 and 3 show block diagrams of three network architectures.

FIG. 1 shows a block diagram of a first network architecture 100, which may be suitable for an LTE network. A UE 110 may communicate with an eNB 120 in a radio access network (RAN) to obtain communication services. The RAN may include other network entities not shown in FIG. 1 for simplicity and may also be referred to as an Evolved Universal Terrestrial Radio Access Network (E-UTRAN). eNB 120 may also be referred to as a Node B, a base station, an access point, etc. UE 110 may also be referred to as a mobile station, a terminal, an access terminal, a subscriber unit, a station, etc. UE 110 may be a cellular phone, a personal digital assistant (PDA), a wireless device, a wireless modem, a wireless router, a laptop computer, a telemetry device, a tracking device, etc.

UE 110 may also receive and measure signals from one or more satellites 190 and obtain pseudo-range measurements for the satellites. Satellites 190 may be part of a Global Navigation Satellite System (GNSS), which may be the United States Global Positioning System (GPS), the European Galileo system, the Russian GLONASS system, or some other GNSS. UE 110 may also measure signals from eNBs and obtain timing measurements (e.g., for time of arrival (TOA) or observed time difference of arrival (OT-DOA)), signal strength measurements, and/or signal quality measurements for the eNBs. The pseudo-range measurements, timing measurements, signal strength measurements, and/or signal quality measurements may be used to derive a location estimate for UE 110. A location estimate may also be referred to as a position estimate, a position fix, etc.

eNB 120 may communicate with an MME 130, which may perform various control functions such as mobility management, gateway selection, authentication, bearer management, etc. MME 130 may communicate with an E-SMLC 140, a Home Subscriber Server (HSS) 150, and a Gateway Mobile Location Center (GMLC) 160. E-SMLC 140 may support UE-based, UE-assisted, network-based and/or network-assisted positioning methods and may support one or more MMEs. E-SMLC 140 may also be referred to as a location server (LS), a standalone SMLC (SAS), etc. E-SMLC 140 may also communicate with GMLC 160 to support location services. GMLC 160 may perform various functions to support location services, interface with external LCS clients (e.g., an LCS client 170), and provide services such as subscriber privacy, authorization, authentication, billing, etc. GMLC 160 may include a Home GMLC (H-GMLC), a Visited GMLC (V-GMLC), and/or a Requesting GMLC (R-GMLC). A Location Routing Function (LRF) 162 may communicate with GMLC 160 and may route or help route IP-based emergency calls to a Public Safety Answering Point (PSAP) associated with the calling UE's location. HSS 150 may also communicate with GMLC 160. HSS 150 may store subscription information for users, perform authentication and authorization of users, and provide information about user location and routing information when requested.

A Serving Gateway (S-GW) 180 may perform various functions related to IP data transfer for UEs such as data routing and forwarding, mobility anchoring, etc. A Packet Data Network (PDN) Gateway 182 may perform various functions such as maintenance of data connectivity for UEs, IP address allocation, etc. An IP Multimedia Subsystem (IMS) network 184 may include various network entities that may support IMS services such as Voice-over-IP (VoIP) calls. A data network 186 may include public network, such as the Internet, and/or private network. A PSAP 188 may be responsible for answering emergency calls (e.g., for police, fire, and medical services) and may communicate with IMS network 184, LRF 162 and/or other network entities directly or indirectly. The various network entities in FIG. 1 may be part of a Home Public Land Mobile Network (H-PLMN) or a Visited PLMN (V-PLMN).

FIG. 1 also shows the interfaces between various network entities. The following interfaces may be defined or enhanced to support control plane solution in LTE:
  SLs interface between MME 130 and E-SMLC 140,
  SLg interface between MME 130 and GMLC 160, and
  Lh interface between HSS 150 and GMLC 160.

The Lh interface between HSS 150 and GMLC 160 may be an enhanced version of an Lh interface between a GMLC and an HLR/HSS in Wideband Code Division Multiple Access (WCDMA) and Global System for Mobile Communications (GSM). The Lh interface may enable HSS 150 to provide the MME address, the VPLMN identity, and/or other information to GMLC 160. The SLg interface may be similar to an Lg interface between a GMLC and either a Serving GPRS Support Node (SGSN) or a Mobile Switching Center (MSC). The SLg interface may enable an H-GMLC to provide the MME address to a V-GMLC when the location of a particular UE is being requested by the H-GMLC. Furthermore, to support control plane solution in LTE, an S1-MME interface between eNB 120 and MME 130 may be modified through addition of new messages and parameters. An LTE-Uu interface between UE 110 and eNB 120 may also be modified at an upper level through use of a new or modified positioning protocol.

FIG. 1 shows a specific design of the first network architecture, with E-SMLC 140 being connected to MME 130. The connection between E-SMLC 140 and MME 130 may avoid the need to stop and restart a location session for UE 110 for an inter-eNB but intra-MME handover. Other variations of the first network architecture are also possible. For example, E-SMLC 140 and MME 130 may be combined. More efficient signaling between E-SMLC 140 and eNB 120 may also be supported to bypass MME 130.

Figure 2:
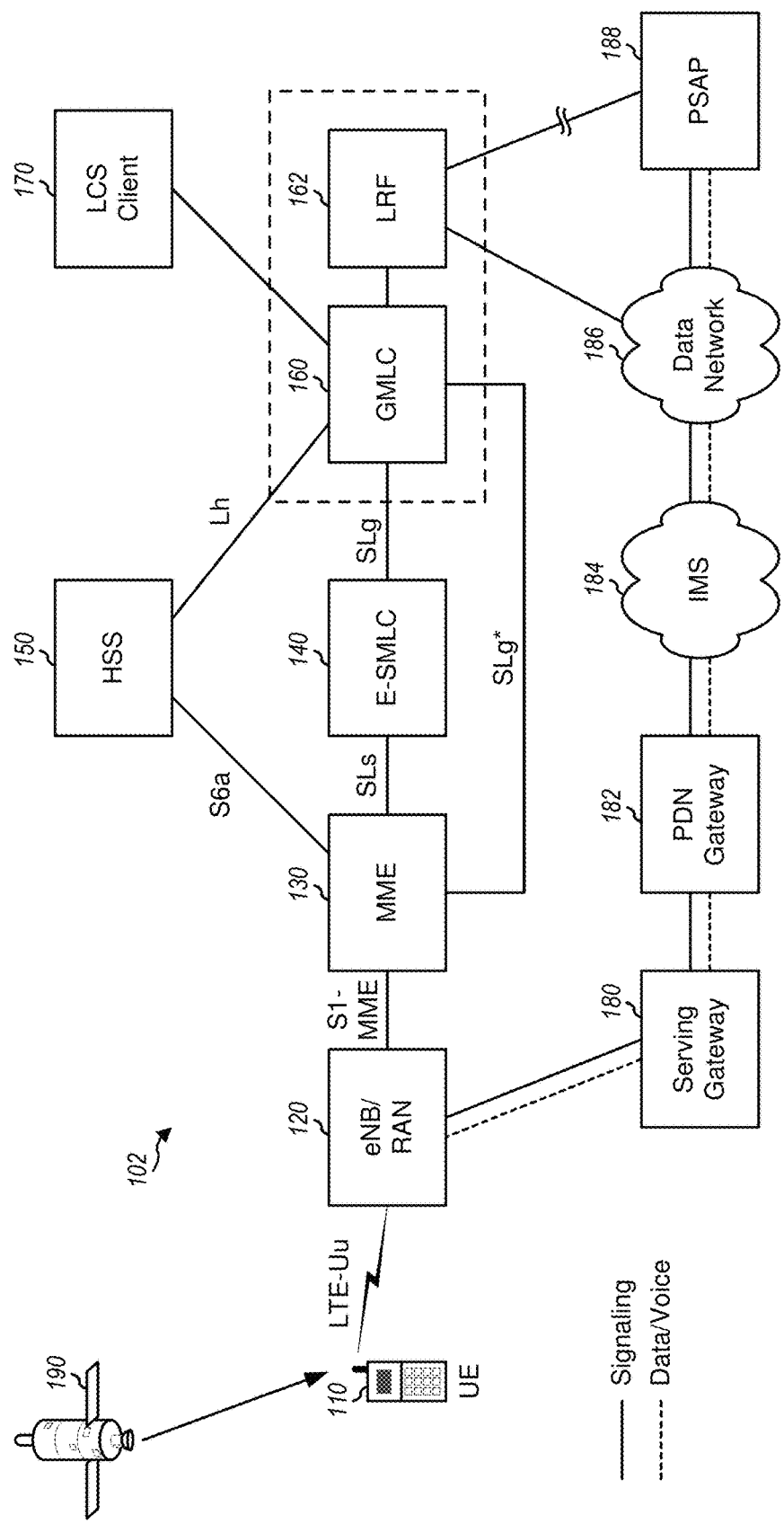

FIG. 2 shows a block diagram of a second network architecture 102, which may also be suitable for an LTE network. In second network architecture 102, MME 130 may communicate with E-SMLC 140, HSS 150, and GMLC 160. E-SMLC 140 and HSS 150 may also communicate with GMLC 160. The network entities in FIG. 2 may perform the functions described above for FIG. 1.

FIG. 2 also shows the interfaces between various network entities. The following interfaces may be defined or enhanced to support control plane solution in LTE:
  SLs interface between MME 130 and E-SMLC 140,
  SLg interface between E-SMLC 140 and GMLC 160,
  SLg* interface between MME 130 and GMLC 160, and
  Lh interface between HSS 150 and GMLC 160.

The SLg* interface may be similar to the Lg interface between a GMLC and either an SGSN or an MSC and may be avoided if the Lh interface is supported. The SLg and SLg* interfaces may be avoided if E-SMLC 140 and GMLC 160 are logically combined. The S1-MME interface and the LTE-Uu interface may be modified to support the control plane solution.

FIG. 2 shows a specific design of the second network architecture, with E-SMLC 140 being connected to MME 130 and GMLC 160. The connection between E-SMLC 140 and GMLC 160 may avoid the need to stop and restart a location session for UE 110 for both an inter-eNB handover and an inter-MME relocation. Other variations of the second network architecture are also possible. For example, E-SMLC 140 and GMLC 160 may be combined, E-SMLC 140 and MME 130 may be combined, etc. More efficient signaling between E-SMLC 140 and eNB 120 may be supported to bypass MME 130.

Figure 3:
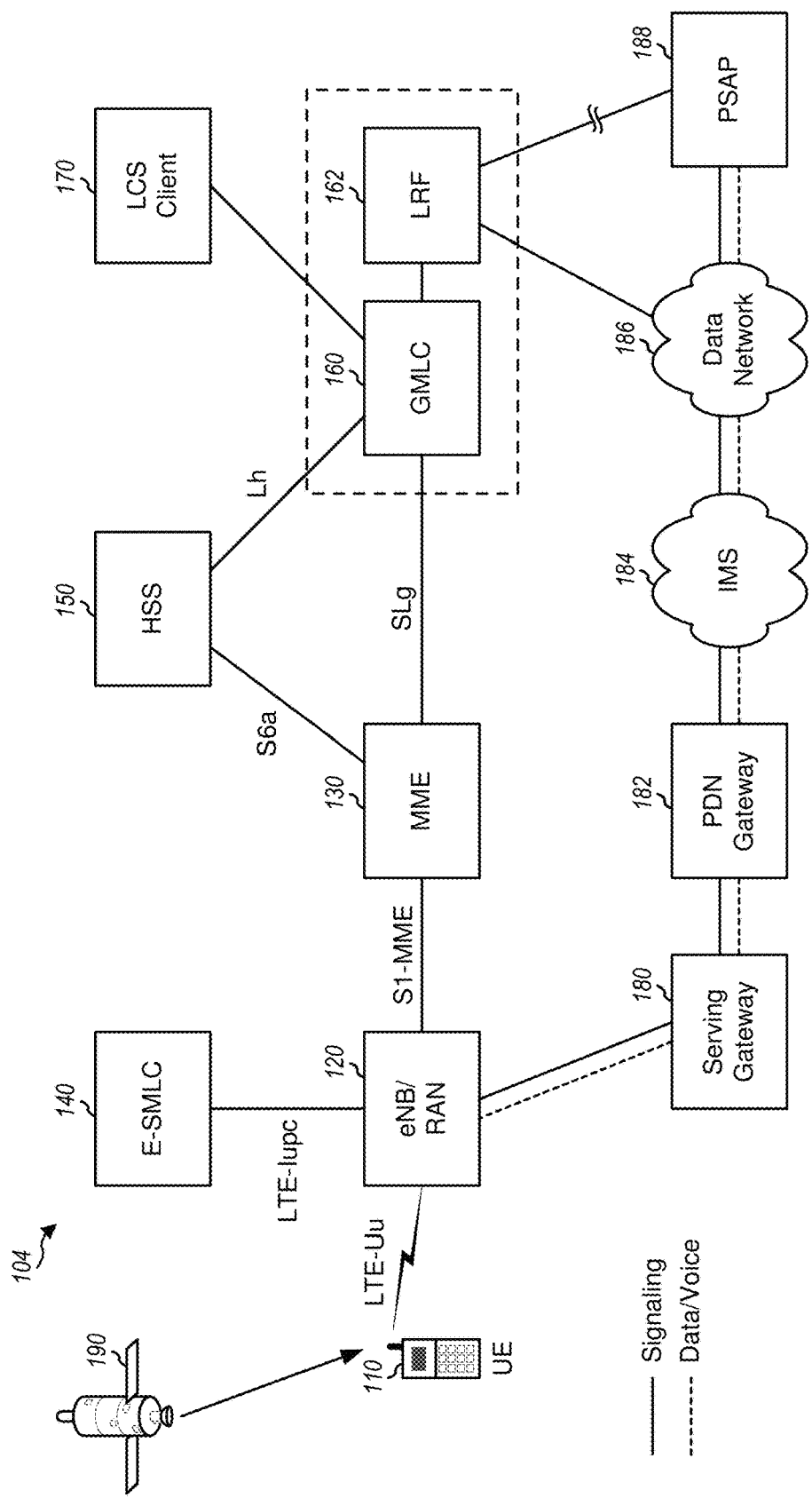

FIG. 3 shows a block diagram of a third network architecture 104, which may also be suitable for an LTE network. In third network architecture 104, E-SMLC 140 may communicate with eNB 120. MME 130 may communicate with HSS 150 and GMLC 160. HSS 150 may also communicate with GMLC 160. The network entities in FIG. 3 may perform the functions described above for FIG. 1.

FIG. 3 also shows the interfaces between various network entities. The following interfaces may be defined or enhanced to support control plane solution in LTE:

LTE-Iupc interface between eNB 120 and E-SMLC 140,
SLg interface between MME 130 and GMLC 160, and
Lh interface between HSS 150 and GMLC 160.

The LTE-Iupc interface may be similar to an Iupc interface between a Radio Network Controller (RNC) and a SAS in WCDMA.

FIG. 3 shows a specific design of the third network architecture, with E-SMLC 140 being connected to eNB 120. The connection between E-SMLC 140 and eNB 120 may allow for use of enhanced RRC-based positioning. Other variations of the third network architecture are also possible.

FIGS. 1, 2 and 3 show three exemplary network architectures that can support location services and positioning. Other network architectures may also be used to support location services and positioning and may include network entities that may be coupled in other manners. These various network architectures may also include network entities not shown in FIGS. 1 to 3. The network entities in FIGS. 1 to 3 may also be referred to by other names. For example, E-SMLC 140 may be referred to as, and/or may include the functionality of, a location center, a positioning center, Position Determination Entity (PDE), etc.

Various call flows may be defined to support location services and positioning. Each call flow may include a sequence of messages exchanged between various network entities. As shown in FIGS. 1 to 3, different network architectures may support communication between different network entities. For example, E-SMLC 140 may be able to communicate with only MME 130 in FIG. 1, with both MME 130 and GMLC 160 in FIG. 2, and with only eNB 120 in FIG. 3. The call flows may thus be dependent on the selected network architecture, which may support communication between certain network entities. For clarity, much of the description below is for the first network architecture shown in FIG. 1, with E-SMLC 140 being able to communicate directly with MME 140 but not eNB 120 or GMLC 160.

Figure 4A:
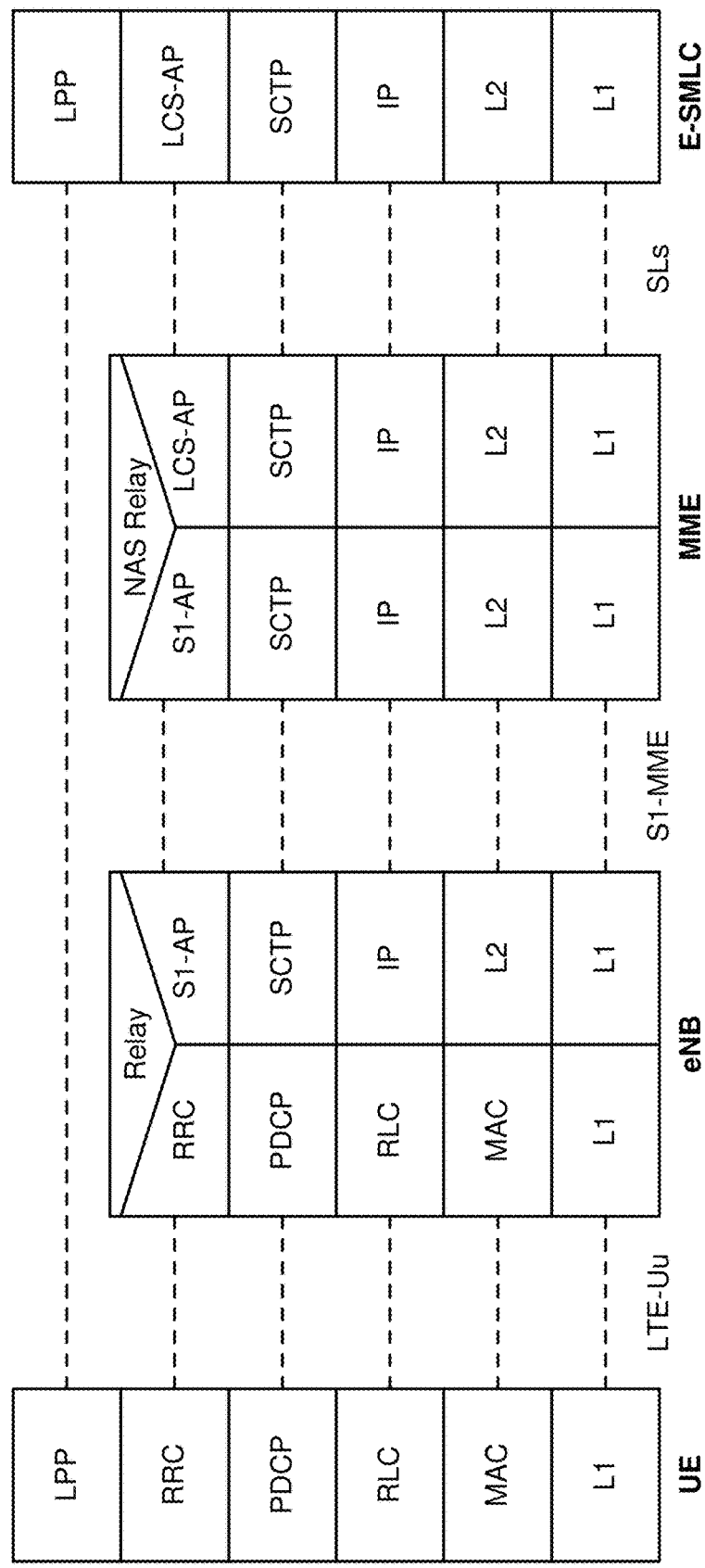
FIGS. 4A and 4B show exemplary protocol stacks at various network entities.

FIG. 4A shows exemplary protocol stacks at UE 110, eNB 120, MME 130 and E-SMLC 140 for communication between UE 110 and E-SMLC 140 based on the first network architecture in FIG. 1. UE 110 may communicate with E-SMLC 140 using an LTE Positioning Protocol (LPP). At UE 110, LPP may operate over Radio Resource Control (RRC), Packet Data Convergence Protocol (PDCP), Radio Link Control (RLC), and Medium Access Control (MAC) in Layer 2 (L2), and E-UTRA airlink in Layer 1 (L1). eNB 120 may communicate with UE 110 via RRC, PDCP, RLC, MAC and L1. eNB 120 may also communicate with MME 130 via S1 Application Protocol (S1-AP), Stream Control Transmission Protocol (SCTP), IP, L2 and L1. MME 130 may communicate with E-SMLC 140 via LCS Application Protocol (LCS-AP), SCTP, IP, L2 and L1. LCS-AP may be functionally similar to parts of Base Station System Application Part-Location Services Extension (BSSAP-LE), Base Station System Location Services Assistance Protocol (BSSLAP), or Radio Access Network Application Part (RANAP) in 3GPP.

UE 110 may exchange (e.g., send and/or receive) LPP messages with E-SMLC 140. The LPP messages may be encapsulated in RRC messages for communication between UE 110 and eNB 120, encapsulated in Non-Access Stratum (NAS) transport messages for communication between eNB 120 and MME 130, and encapsulated in LCS-AP messages for communication between MME and E-SMLC 140. The RRC messages may be exchanged between UE 110 and eNB 120 with the protocols shown for these entities in FIG. 4A. The NAS transport messages may be exchanged between eNB 120 and MME 130 with the protocols shown for these entities in FIG. 4A. The LCS-AP messages may be exchanged between MME 130 and E-SMLC 140 with the protocols shown for these entities in FIG. 4A.

Figure 4B:
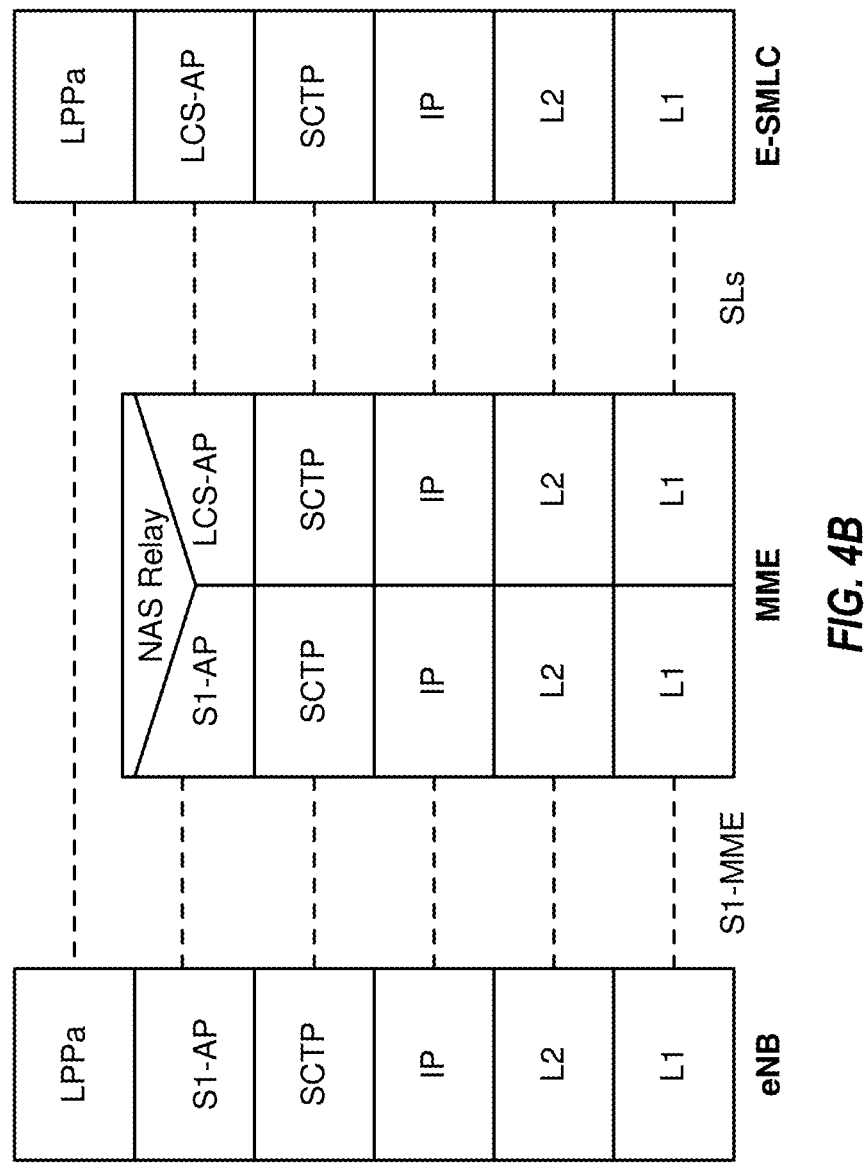

FIG. 4B shows exemplary protocol stacks at eNB 120, MME 130 and E-SMLC 140 for communication between eNB 120 and E-SMLC 140 based on the first network architecture in FIG. 1. eNB 120 may communicate with E-SMLC 140 via an LPP annex (LPPa) protocol, which may be a thin protocol similar to LPP used between UE 110 and E-SMLC 140. LPPa may reside on top of S1-AP, SCTP, IP, L2 and L1 between eNB 120 and MME 130 and on top of LCS-AP, SCTP, IP, L2 and L1 between MME 130 and E-SMLC 140.

FIG. 4A shows the protocol stacks for communication between UE 110 and E-SMLC 140. FIG. 4B shows the protocol stacks for communication between eNB 120 and E-SMLC 140. Communication between other network entities may also be supported by a suitable set of protocol stacks. For example, UE 110 may communicate with MME 130 via NAS. NAS may reside on top of RRC, PDCP, RLC, MAC and L1 between UE 110 and eNB 120, and on top of S1-AP, SCTP, IP, L2 and L1 between eNB 120 and MME 130. Other protocol stacks may also be used for communication between the various network entities for each of the three network architectures described above. LPP may be used end to end (e.g., between UE 110 and E-SMLC 140) for all three network architectures described above.

For LTE, MAC is described in 3GPP TS 36.321, RLC is described in 3GPP TS 36.322, PDCP is described in 3GPP TS 36.323, RRC is described in 3GPP TS 36.331, and S1-AP is described in 3GPP TS 36.413. SCTP is described in RFC 2960, and IP is described in RFCs 791 and 2460. These various 3GPP TS documents are publicly available from 3GPP, and these various RFCs are publicly available from The Internet Engineering Task Force (IETF).

Figure 5:
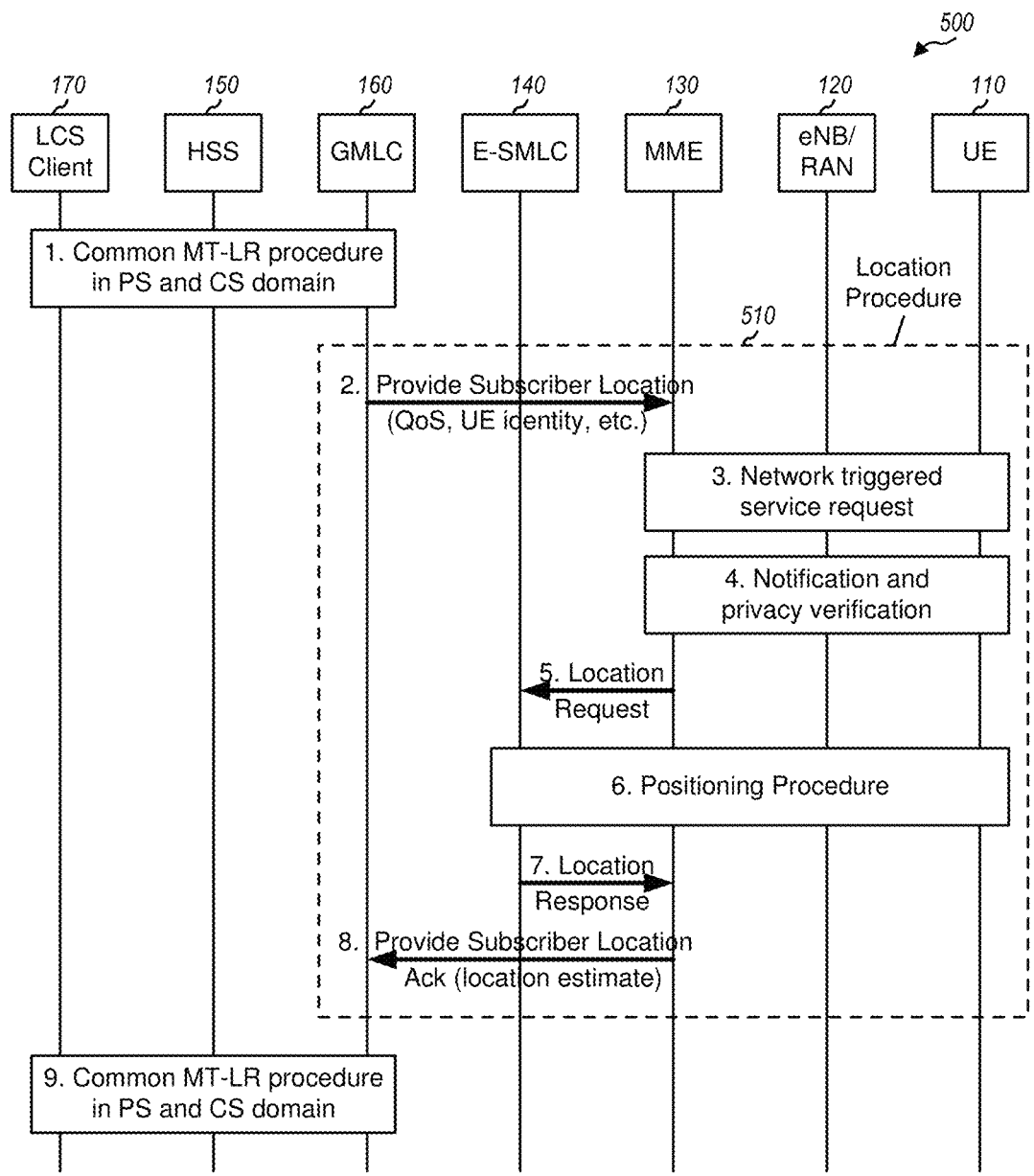
FIG. 5 shows a call flow for a Mobile Terminated Location Request procedure.

FIG. 5 shows a design of a call flow 500 for a Mobile Terminated Location Request (MT-LR) procedure for the first network architecture shown in FIG. 1. LCS client 170 may initiate a common MT-LR procedure in packet-switched (PS) and circuit-switched (CS) domain with GMLC 160 and HSS 150 in order to send an LCS service request (step 1). A location procedure 510 may be performed in response to the LCS service request.

For location procedure 510, GMLC 160 may send a Provide Subscriber Location (PSL) message to MME 130, which may be indicated by HSS 150 (step 2). The PSL message may include the type of location information being requested (e.g., current location, velocity, etc.), an International Mobile Subscriber Identity (IMSI) of the UE subscriber, LCS quality-of-service (QoS) information (e.g., accuracy, response time, etc.), privacy related action for the UE subscriber, etc. If GMLC 160 is located in another PLMN or another country, then MME 130 may authenticate that a location request is allowed from this PLMN or from this country and may return an error response if it is not allowed. If the PSL message includes indicators of privacy related action, then MME 130 may determine a required privacy related action. If UE 110 is in an idle state, then MME 130 may perform a network triggered service request procedure in order to establish a signaling connection for UE 110 and to assign a specific eNB (e.g., eNB 120) to UE 110 (step 3). If the PSL message indicates that UE 110 should either be notified or be notified with privacy verification, then MME 130 may notify UE 110 of the location request and may verify its privacy preference (step 4). Step 4 may include sending a Location Notification Invoke message to UE 110. UE 110 may wait for the user to grant or withhold permission and may then return a Location Notification Return Result message to MME 130.

MME 130 may select E-SMLC 140 and may send a Location Request message to E-SMLC 140 (step 5). The Location Request message may include the type of location information being requested, the requested LCS QoS, the identity of the serving eNB, the UE positioning capabilities, etc. If the requested location information and location accuracy within the LCS QoS can be satisfied based on parameters (e.g., eNB identity) received from MME 130, then E-SMLC 140 may send a Location Response message immediately (not shown in FIG. 5). Otherwise, E-SMLC 140 may determine one or more positioning methods to use and may instigate a positioning procedure for the positioning method(s) (step 6). E-SMLC 140 may receive measurements from the positioning procedure and may compute a location estimate for UE 110 based on the measurements. If E-SMLC 140 fails to receive measurements, then it may use the current eNB identity to obtain an approximate location estimate for UE 110. E-SMLC 140 may also receive a location estimate from UE 110, which may be obtained with a UE-based positioning method, and may verify consistency of this location estimate with the current eNB location. If the location estimate does not satisfy the requested accuracy and sufficient response time still remains, then E-SMLC 140 may instigate another positioning procedure using the same or different positioning method. If a vertical location coordinate is requested but E-SMLC 140 only obtains horizontal coordinates, then E-SMLC 140 may return the horizontal coordinates.

After completing the positioning procedure in step 6, E-SMLC 140 may send a Location Response message to MME 130 (step 7). The Location Response message may include a location estimate for UE 110 obtained from the positioning procedure, an indication of whether the location estimate satisfies the requested accuracy, the positioning method used to obtain the location estimate, a failure cause if a location estimate could not be obtained, etc.

MME 130 may then return the requested location information to GMLC 160 (step 8). MME 130 may return an error response to GMLC 160 if (i) permission is not granted by the user or is not received from UE 110 for the privacy verification in step 4 or (ii) a valid location estimate is not obtained from E-SMLC 140 in step 7. MME 130 may also return the last known location of UE 110 if allowed and if a valid location estimate is not obtained. MME 130 may record charging information. The common MT-LR procedure in PS and CS domain may be performed to return the location information to LCS client 170 (step 9).

Notification and privacy verification with UE 110 may be performed prior to sending the Location Request message to E-SMLC 140, as shown in FIG. 5. Notification and privacy verification may also be performed at the same time or after sending the Location Request message. In these cases, location procedure 510 in step 6 may be stopped by MME 130 or the location estimate obtained from the positioning procedure may be discarded by MME 130 if the UE privacy actions lead to a rejection of the MT-LR procedure by UE 110 or the user.

Figure 6:
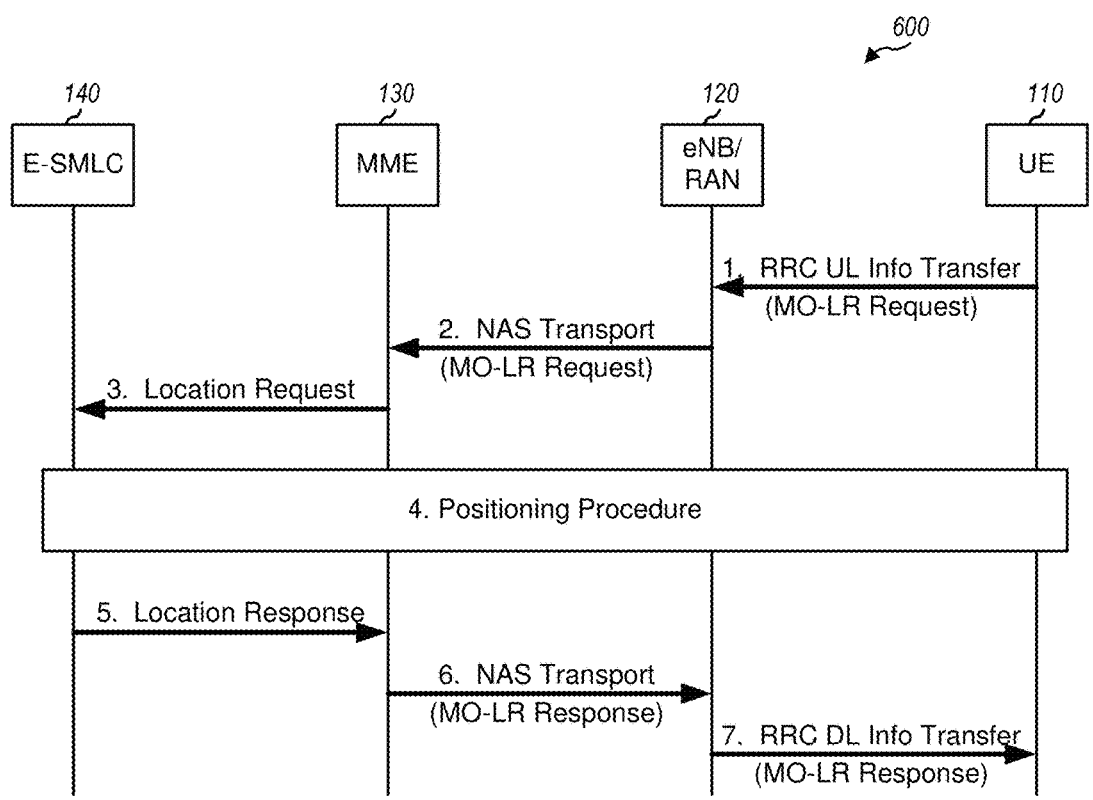
FIG. 6 shows a call flow for a Mobile Originated Location Request procedure.

FIG. 6 shows a design of a call flow 600 for a Mobile Originated Location Request (MO-LR) procedure for the first network architecture shown in FIG. 1. UE 110 may send an MO-LR Request message inside an RRC Uplink Information (UL Info) Transfer message to eNB 120 (step 1). eNB 120 may forward the MO-LR Request message inside a NAS Transport message to MME 130 (step 2). MME 130 may verify the UE subscription for the MO-LR request. MME 130 may then send a Location Request message to E-SMLC 140 (step 3). The Location Request message may include LCS QoS and/or other information. E-SMLC 140 may perform a positioning procedure with UE 110 appropriate for the LCS QoS (step 4). E-SMLC 140 may then return the resultant location information (e.g., a location estimate for UE 110) to MME 130 (step 5). MME 130 may return the location information (e.g., the location estimate) in an MO-LR Response message inside a NAS Transport message to eNB 120 (step 6). eNB 120 may forward the location information in the MO-LR Response message inside an RRC Downlink Information (DL Info) Transfer message to UE 110 (step 7).

For an MO-LR transfer to third party, which is not shown in FIG. 6, MME 130 may forward the location information obtained in step 5 to a V-GMLC. The location information may then be forwarded to an LCS client via an H-GMLC for UE 110 and an R-GMLC.

Figure 7:
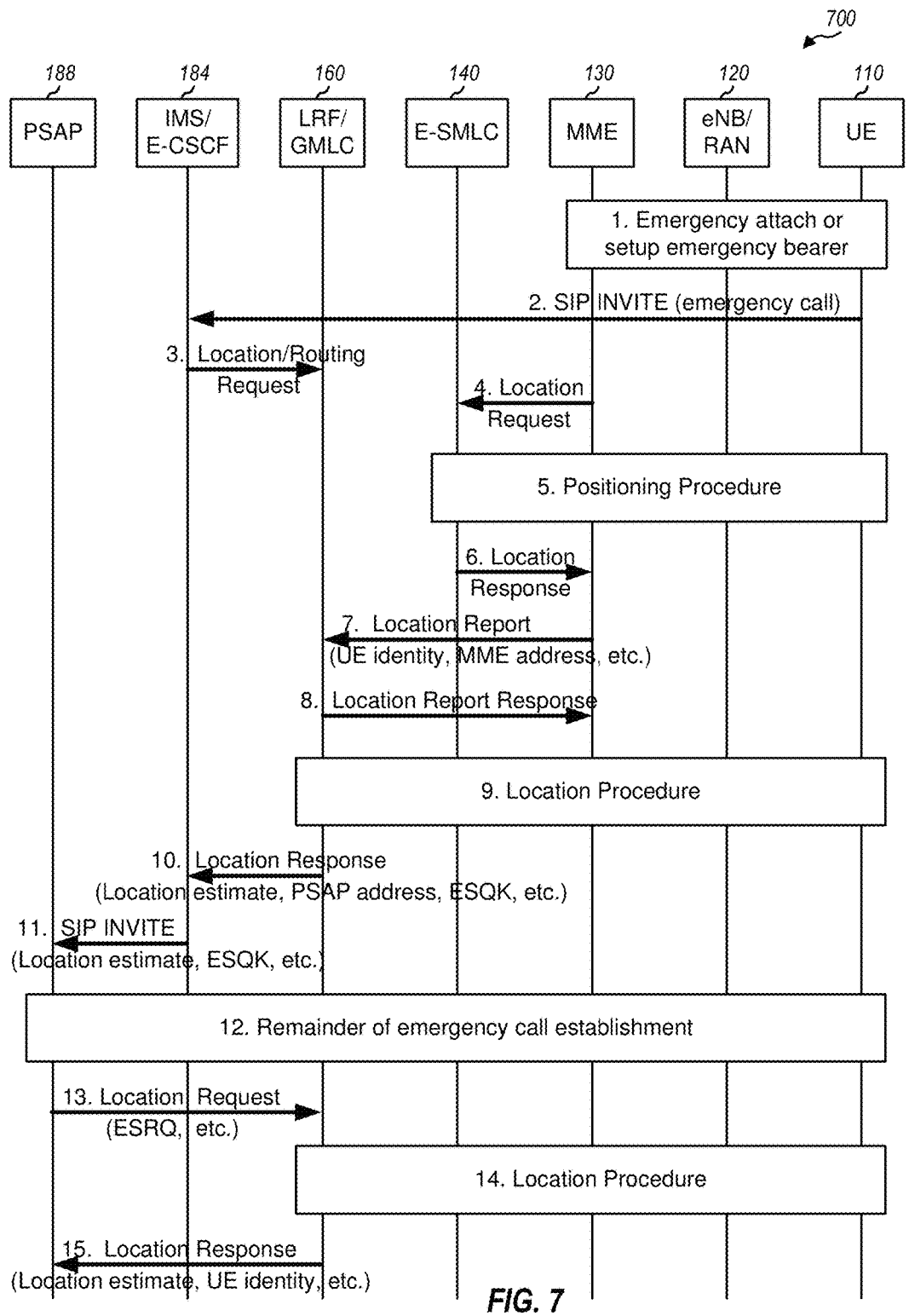
FIG. 7 shows a call flow for an emergency call.

FIG. 7 shows a design of a call flow 700 for an emergency call for any of the network architectures described above. UE 110 may detect an emergency call invocation from the user and may attach to EPS, if it is not already attached, and may obtain a suitable IP bearer for the user plane in Serving Gateway 180 and PDN Gateway 182 (step 1). An emergency indication may be used for the attach or the bearer allocation to inform MME 130 that an emergency call is in progress. If UE 110 does not detect the emergency call (e.g., does not recognize the dialed emergency number), then a Proxy Call Server Control Function (P-CSCF) within IMS network 184 may reject the initial request and may force UE 110 to first obtain emergency IP access and perform an emergency registration, which would ensure that a new emergency bearer allocation would occur via MME 130.

After completing the bearer setup in step 1, UE 110 may send a Session Initiation Protocol (SIP) INVITE message for the emergency call to an Emergency CSCF (E-CSCF) in IMS network 184 (step 2). The E-CSCF may send a location and/or routing request to LRF 162, which may forward this request to GMLC 160 (step 3).

As a consequence of UE 110 requesting emergency access or an emergency bearer from MME 130 in step 1, MME 130 may select E-SMLC 140 and may send a Location Request message to E-SMLC 140 (step 4). E-SMLC 140 may determine one or more positioning methods to use and may instigate a positioning procedure for the positioning method(s). E-SMLC 140, MME 130, eNB 120 and/or UE 110 may perform the positioning procedure to obtain location information for UE 110 (step 5). For example, a network-based positioning procedure such as enhanced cell identity (E-CID) or a positioning procedure described below may be used for step 5. After completing the positioning procedure, E-SMLC 140 may send a Location Response message with a location estimate for UE 110 to MME 130 (step 6).

After step 6, or after step 1 if steps 4 to 6 are not performed, MME 130 may send a Location Report message to GMLC 160, which may be designated to support location for the emergency call (step 7). MME 130 may be provisioned with the address of GMLC 160. The Location Report message may include the UE identity (e.g., the IMSI), the IP address of MME 130, the location estimate for the UE (if steps 4 to 6 are performed), etc. GMLC 160 may acknowledge the Location Report message (step 8). If steps 4 to 6 are not performed, or if the location estimate from steps 4 to 6 is not suitable, then GMLC 160 may obtain location information for UE 110 using a location procedure applicable to the network architecture, e.g., location procedure 510 in FIG. 5 (step 9). GMLC 160 may then return the location information to LRF 162, which may use the location information to obtain routing information for PSAP 188. LRF 162 may then return the location information, PSAP routing information, correlation information (e.g., an ESQK), and/or other information to the E-CSCF within IMS network 184 (step 10). The E-CSCF may route the emergency call to PSAP 188 and may also forward the ESQK (if available) to PSAP 188, which may be indicated by LRF 162 (step 11). The remainder of the emergency call establishment may occur between PSAP 188 and UE 110 and other network entities (step 12).

PSAP 188 may send a request for more accurate location of UE 110 to LRF 162, which may be determined using the ESQK (step 13). LRF 162 may forward the request to GMLC 160. GMLC 160 may obtain location information for UE 110 using a positioning procedure applicable to the network architecture (e.g., location procedure 510 in FIG. 5) and may provide the location information to LRF 162 (step 14). LRF 162 may then return the location information to PSAP 188 (step 15).

Figure 8:
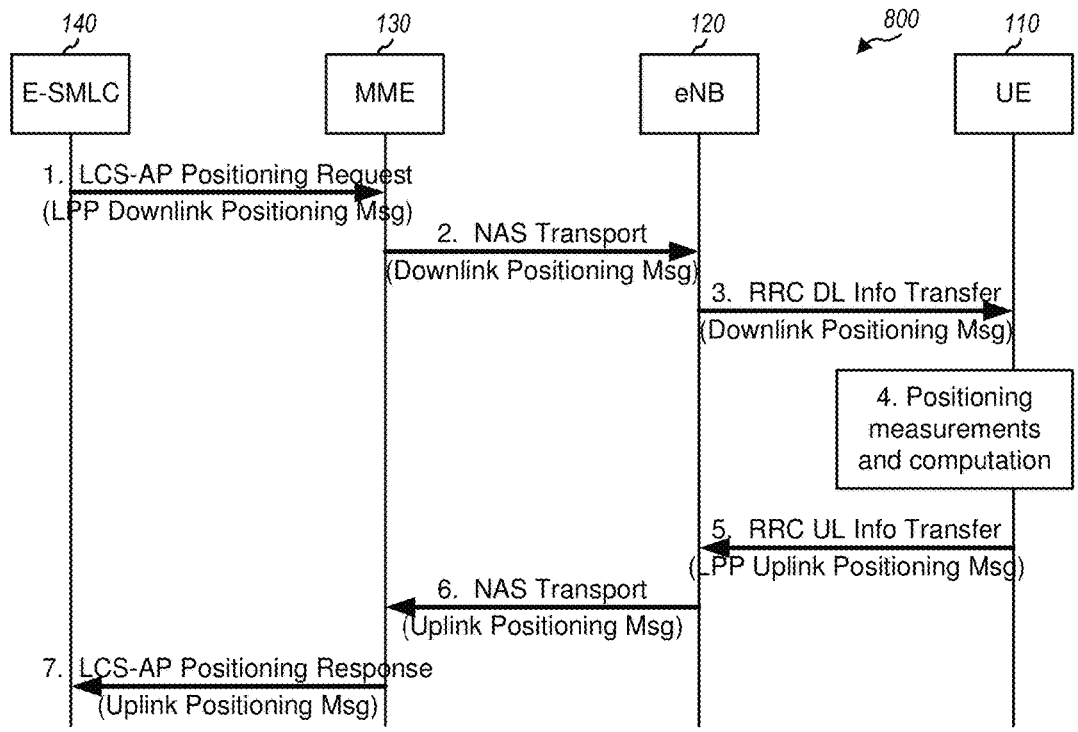
FIG. 8 shows a call flow for a UE-assisted or UE-based positioning procedure.

FIG. 8 shows a design of a call flow 800 for a UE-assisted or UE-based positioning procedure, which may be used for step 6 in call flow 500 in FIG. 5, step 4 in call flow 600 in FIG. 6, step 5 in call flow 700 in FIG. 7, etc. This positioning procedure may be used by E-SMLC 140 to support UE-assisted positioning, UE-based positioning, and delivery of assistance data. In general, one or more of these positioning services may be performed for UE 110 in the same positioning procedure.

E-SMLC 140 may send a Positioning Request message to MME 130 (step 1). The Positioning Request message may be an LCS-AP message and may carry a Downlink Positioning message or an LPP protocol data unit (PDU), which may be part of LPP. The description below assumes the use of the Downlink Positioning message instead of the LPP PDU. The Downlink Positioning message may request location information (e.g., specific measurements) from UE 110, provide assistance data, query for UE capabilities, etc. MME 130 may forward the Downlink Positioning message in a NAS Transport message to serving eNB 120 (step 2). The contents of the Downlink Positioning message may be transparent to both MME 130 and eNB 120. MME 130 may not retain state information for the Positioning Request message and may treat the response in step 6 as a separate transaction. eNB 120 may forward the Downlink Positioning message in an RRC Downlink Information Transfer message to UE 110 (step 3).

UE 110 may store assistance data (if any) provided in the Downlink Positioning message and may perform any positioning measurements and location computation (if any) as requested by the Downlink Positioning message (step 4). UE 110 may then send an Uplink Positioning message (or an LLP PDU) in an RRC Uplink Information Transfer message to eNB 120 (step 5). The Uplink Positioning message may include the requested location information (e.g., information for measurements made by UE 110), information for the UE capabilities, a request for additional assistance data, etc. eNB 120 may forward the Uplink Positioning message in a NAS Transport message to MME 130 (step 6). MME 130 may forward the Uplink Positioning message in a Positioning Response message to E-SMLC 140 (step 7). Steps 1 to 7 may be repeated to send new assistance data, to request additional location information, to request additional UE capabilities, etc.

Figure 9:
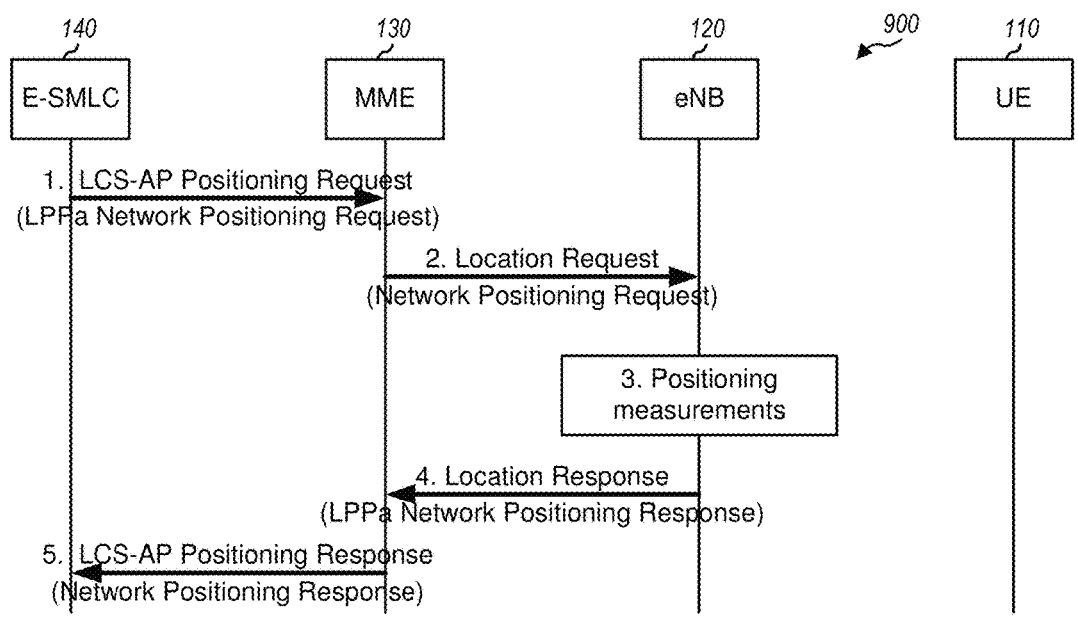
FIG. 9 shows a call flow for a network-based positioning procedure.

FIG. 9 shows a design of a call flow 900 for a network-assisted or network-based positioning procedure, which may also be used for step 6 in call flow 500 in FIG. 5, step 4 in call flow 600 in FIG. 6, step 5 in call flow 700 in FIG. 7, etc. This positioning procedure may be used by E-SMLC 140 to support network-assisted positioning and network-based positioning.

E-SMLC 140 may send a Positioning Request message carrying a Network Positioning Request message to MME 130 (step 1). The Network Positioning Request message may be an LPPa message, and the Positioning Request message may be an LCS-AP message. The Network Positioning Request message may request location information for UE 110 from RAN 120, may query for RAN capabilities, may include parameters for RAN 120 defining the type of measurement information required, etc. MME 130 may send a Location Request message carrying the Network Positioning Request message to serving eNB 120 for UE 110 (step 2). eNB 120 may obtain location information for UE 110, as requested in step 2 (step 3). eNB 120 may then return a Location Response message carrying a Network Positioning Response message to MME 130 (step 4). The Network Positioning Response message may carry the requested location information, Cell Global Identity (CGI), etc. MME 130 may return a Positioning Response message carrying the Network Positioning Response message to E-SMLC 140 (step 5). The Positioning Response message may include the requested location information, the CGI, and any requested RAN capabilities. Steps 1 to 5 may be repeated to request additional location information and/or RAN capabilities. E-SMLC 140 may compute a location estimate for UE 110 based on the measurements from eNB 120.

The control plane solution described herein may provide various advantages. First, the control plane solution may be compatible with the solutions for other radio technologies such as GPRS, which may enable continuing location support for emergency calls handed off between different radio technologies such as GSM, UMTS and LTE. Second, the control plane solution may support stateless location in eNB 120 and stateless positioning procedures in MME 130. Location information and location activity may be hidden from MME 130 and eNB 120 where possible in order to reduce impact to the MME and eNB. Third, UE-based and UE-assisted positioning protocol similar to RRLP or RRC may be supported. Fourth, disruption in location due to intra-MME/inter-eNB handover may be avoided by having MME 130 communicate with E-SMLC 140. Fifth, the control plane solution can support positioning methods similar to those used for GSM and UMTS, which may simplify implementation. Sixth, positioning is possible without requiring support by or explicit involvement of the UE. The control plane solution described herein may also provide other advantages.

Figures 10, 11, 12:
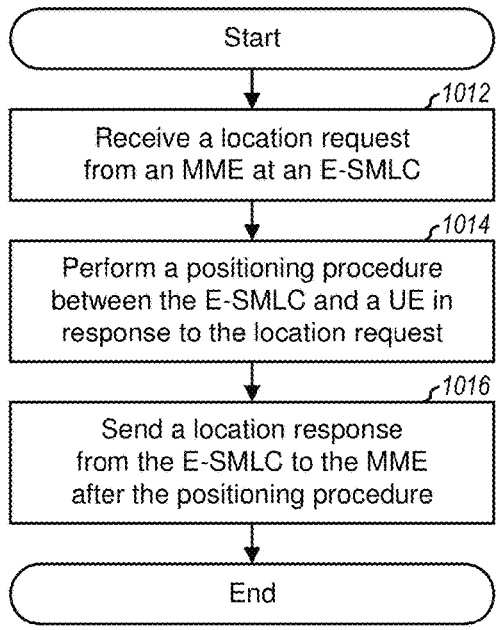
FIGS. 10, 11 and 12 show processes for supporting location services and positioning by an E-SMLC, an MME, and a UE, respectively.

FIG. 10 shows a design of a process 1000 for supporting location services and positioning by an E-SMLC, which may also be referred to as a location server or by other names. The E-SMLC may receive a location request from an MME (e.g., in step 5 in FIG. 5, step 3 in FIG. 6, or step 4 in FIG. 7) (block 1012). The E-SMLC may perform a positioning procedure with a UE in response to the location request (block 1014). The E-SMLC may send a location response to the MME after the positioning procedure (block 1016).

In one design, the UE-assisted or UE-based positioning procedure shown in FIG. 8 may be performed for block 1014. In this design, the E-SMLC may send a downlink positioning message to the MME for forwarding to the UE. The E-SMLC may thereafter receive an uplink positioning message sent by the UE and forwarded by the MME. The downlink positioning message may request location information from the UE and may further include assistance data for the UE, a request for UE capabilities, etc. The uplink positioning message may include the requested location information. The downlink positioning message may be for a first protocol (e.g., LPP, as described for FIGS. 4A and 8) and may be encapsulated in a positioning request message for a second protocol (e.g., LCS-AP, as also described for FIGS. 4A and 8) below the first protocol. The uplink positioning message may also be for the first protocol and may be encapsulated in a positioning response message for the second protocol. The requested location information may comprise measurements, and the E-SMLC may compute a location estimate for the UE based on the measurements. The E-SMLC may send the location estimate in the location response to the MME. The messages may also be referred to by other names.

In another design, the network-based positioning procedure shown in FIG. 9 may be performed for block 1014. In this design, the E-SMLC may send a network positioning request message to the MME for forwarding to an eNB. The E-SMLC may thereafter receive a network positioning response message sent by the eNB and forwarded by the MME. The network positioning request message may request location information from the eNB, and the network positioning response message may include the requested location information. The network positioning request message may be for a first protocol (e.g., LPPa, as described for FIGS. 4B and 9) and may be encapsulated in a positioning request message for a second protocol (e.g., LCS-AP, as also described for FIGS. 4B and 9) below the first protocol. The network positioning response message may also be for the first protocol and may be encapsulated in a positioning response message for the second protocol. The messages may also be referred to by other names.

FIG. 11 shows a design of a process 1100 for supporting location services and positioning by an MME, which may also be referred to by other names. The MME may receive a request for location information for a UE (block 1112). This request may be a provide subscriber location message from a GMLC (e.g., step 2 in FIG. 5), an MO-LR Request message (e.g., step 2 in FIG. 6), a message sent during emergency attach or emergency bearer setup (e.g., step 1 in FIG. 7), a message from an LCS client, etc. The MME may send a location request to an E-SMLC in response to receiving the request for location information (block 1114). The MME may then assist with a positioning procedure between the E-SMLC and the UE, which may be initiated by the E-SMLC in response to the location request from the MME (block 1116). The MME may receive a location response sent by the E-SMLC after the positioning procedure (block 1118). The MME may send a response for the request for location information (block 1120). This response may include a location estimate for the UE and may be a provide subscriber location ack message sent to the GMLC (e.g., step 8 in FIG. 5), an MO-LR Response message (e.g., step 6 in FIG. 6), etc.

The MME may perform a network triggered service request procedure with the UE to establish a signaling connection for the UE (e.g., step 3 in FIG. 5). The MME may also perform notification and privacy verification with the UE prior to sending the location request to the E-SMLC (e.g., step 4 in FIG. 5).

In one design of block 1116, which is shown in FIG. 8, the MME may receive a downlink positioning message sent by the E-SMLC to request location information from the UE. The MME may forward the downlink positioning message to the UE. The MME may thereafter receive an uplink positioning message sent by the UE to return the requested location information to the E-SMLC. The MME may forward the uplink positioning message to the E-SMLC. The MME may maintain no state information for the downlink positioning message. The downlink positioning message may be encapsulated in other messages at lower layer, e.g., in a positioning request message by the E-SMLC, in a NAS transport message by the MME, and in an RRC downlink info transfer message by an eNB. The uplink positioning message may also be encapsulated in other messages at lower layer, e.g., in an RRC uplink info transfer message by the UE, in a NAS transport message by the eNB, and in a positioning response message by the MME.

In another design of block 1116, which is shown in FIG. 9, the MME may receive a network positioning request message sent by the E-SMLC to request location information from an eNB. The MME may forward the network positioning request message to the eNB. The MME may thereafter receive a network positioning response message sent by the eNB to return the requested location information to the E-SMLC. The MME may forward the network positioning response message to the E-SMLC. The network positioning request message may be encapsulated in other messages at lower layer, e.g., in a positioning request message by the E-SMLC and in a location request message by the MME. The network positioning response message may also be encapsulated in other messages, e.g., in a location response message by the eNB and in a positioning response message by the MME.

FIG. 12 shows a design of a process 1200 for supporting location services and positioning by a UE, which may also be referred to by other names. The UE may perform a positioning procedure with an E-SMLC, with the positioning procedure being initiated by the E-SMLC in response to a location request sent by an MME to the E-SMLC (block 1212). The location request may be sent by the MME in response to a request for location information for the UE sent by a GMLC, an LCS client, or the UE. The UE may also send a message to originate an emergency call, and the positioning procedure may be performed for the emergency call. The UE may perform notification and privacy verification with the MME prior to, during, or after the positioning procedure (block 1214).

In one design of block 1212, which is shown in FIG. 8, the UE may receive a downlink positioning message sent by the E-SMLC and forwarded by the MME to the UE. The UE may send an uplink positioning message toward the E-SMLC and forwarded by the MME. The downlink positioning message may request location information from the UE, and the uplink positioning message may include the requested location information. The downlink and uplink positioning messages may be encapsulated in messages at lower layer.

Figure 13:
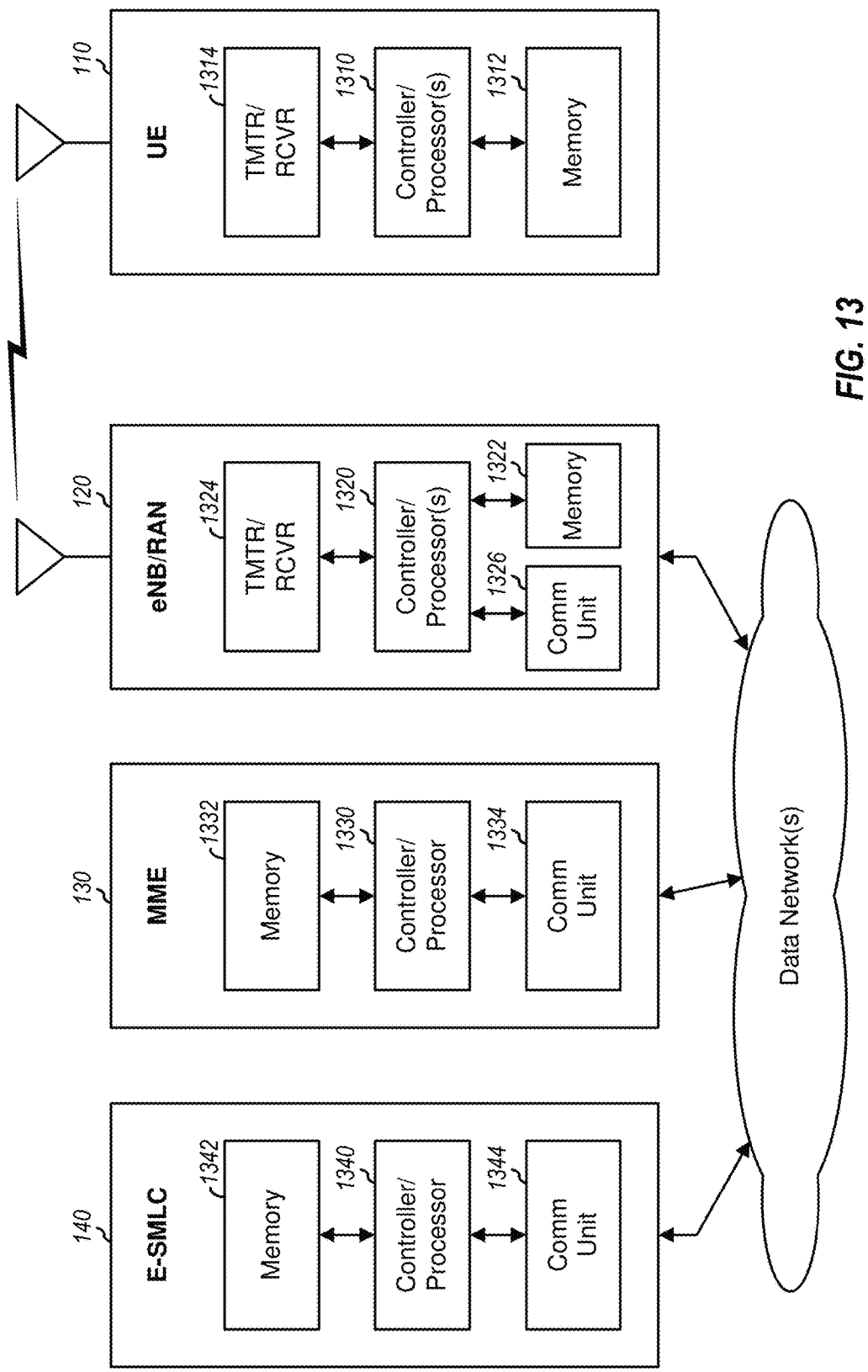
FIG. 13 shows a block diagram of various network entities.

FIG. 13 shows a block diagram of a design of UE 110, eNB/RAN 120, MME 130, and E-SMLC 140. For simplicity, FIG. 13 shows (i) one or more controller/processors 1310, memory 1312, and transmitter/receiver (TMTR/RCVR) 1314 for UE 110, (ii) controller/processor(s) 1320, memory 1322, transmitter/receiver 1324, and communication (Comm) unit 1326 for eNB/RAN 120, (iii) controller/processor(s) 1330, memory 1332, and communication unit 1334 for MME 130, and (iv) controller/processor(s) 1340, memory 1342, and communication unit 1344 for E-SMLC 140. In general, each entity may include any number of controllers, processors, memories, transceivers, communication units, etc.

On the downlink, eNB 120 may transmit traffic data, messages/signaling, and pilot to UEs within its coverage area. These various types of data may be processed by processor(s) 1320 and conditioned by transmitter 1324 to generate a downlink signal, which may be transmitted to the UEs. At UE 110, the downlink signals from eNB 120 may be received and conditioned by receiver 1314, and processed by processor(s) 1310 to obtain various types of information for location services, positioning, and/or other services. For example, processor(s) 1310 may decode messages used for the call flows described above. Processor(s) 1310 may also perform or direct process 1100 in FIG. 11 and/or other processes for the techniques described herein. Memories 1312 and 1322 may store program codes and data for UE 110 and eNB 120, respectively.

On the uplink, UE 110 may transmit traffic data, messages/signaling, and pilot to eNB 120. These various types of data may be processed by processor(s) 1310 and conditioned by transmitter 1314 to generate an uplink signal, which may be transmitted to eNB 120. At eNB 120, the uplink signals from UE 110 and other UEs may be received and conditioned by receiver 1324 and further processed by processor(s) 1320 to obtain various types of information, e.g., data, messages/signaling, etc. eNB 120 may communicate with other network entities via communication unit 1326.

Within MME 130, processor(s) 1330 may perform processing to support location services and positioning, memory 1332 may store program codes and data for MME 130, and communication unit 1334 may allow MME 130 to communicate with other entities. Processor(s) 1330 may perform processing for MME 130 in the call flows described above. Processor(s) 1330 may also perform or direct process 1100 in FIG. 11 and/or other processes for the techniques described herein.

Within E-SMLC 140, processor(s) 1340 may perform processing to support location services and positioning, memory 1342 may store program codes and data for E-SMLC 140, and communication unit 1344 may allow E-SMLC 140 to communicate with other entities. Processor(s) 1340 may perform processing for E-SMLC 140 in the call flows described above. Processor(s) 1340 may also perform or direct process 1000 in FIG. 10 and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of supporting location services and positioning, comprising:
   receiving, at a mobility management entity (MME), a subscriber location message from a gateway mobile location center (GMLC);
   sending, by the MME, a location request to an Evolved Serving Mobile Location Center (E-SMLC) based at least in part on receiving the subscriber location message;
   assisting, by the MME, with a positioning procedure between the E-SMLC and a user equipment (UE) after sending the location request; and
   receiving, at the MME, a location response from the E-SMLC after the positioning procedure, wherein the location response comprises information indicating whether a location estimate included in the location response satisfies a defined Quality of Service (QoS) and information indicating a positioning method used to obtain the location estimate.

2. The method of claim 1, wherein sending the location request comprises:
   sending the location request during at least one of an emergency attach or an emergency bearer setup.

3. The method of claim 1, further comprising:
   selecting the E-SMLC based at least in part on receiving a request from the UE for at least one of an emergency access or an emergency bearer, wherein sending the location request further comprises:
   sending the location request to the selected E-SMLC.

4. The method of claim 1, further comprising:
   performing a network triggered service request procedure with the UE to establish a signaling connection for the UE.

5. The method of claim 1, further comprises:
   performing notification and privacy verification with the UE prior to establishing a signaling connection for the UE.

6. The method of claim 1, further comprising:
   receiving a positioning message that provides a downlink positioning message for forwarding to a base station;
   forwarding the positioning message to the base station for performing positioning measurement; and
   receiving a base station-generated positioning measurement from the base station.

7. The method of claim 6, wherein the downlink positioning message is for a first protocol and the positioning message is for a lower layer protocol than the first protocol.

8. An apparatus for supporting location services and positioning, comprising:
   a processor;
   memory in electronic communication with the processor; and
   instructions stored in the memory and operable, when executed by the processor, to cause the apparatus to:
      receive, at a mobility management entity (MME), a subscriber location message from a gateway mobile location center (GMLC);
      send, by the MME, a location request to an Evolved Serving Mobile Location Center (E-SMLC) based at least in part on receiving the subscriber location message;
      assist, by the MME, with a positioning procedure between the E-SMLC and a user equipment (UE) after sending the location request; and
      receive, at the MME, a location response from the E-SMLC after the positioning procedure, wherein the location response comprises information indicating whether a location estimate included in the location response satisfies a defined Quality of Service (QoS) and information indicating a positioning method used to obtain the location estimate.

9. The apparatus of claim 8, wherein the instructions for sending the location request are further executable by the processor to:
   send the location request during at least one of an emergency attach or an emergency bearer setup.

10. The apparatus of claim 8, wherein the instructions are further executable by the processor to:
    select the E-SMLC based at least in part on receiving a request from the UE for at least one of an emergency access or an emergency bearer, wherein the instructions for sending the location request are further executable by the processor to:
    send the location request to the selected E-SMLC.

11. The apparatus of claim 8, wherein the instructions are further executable by the processor to:
    perform a network triggered service request procedure with the UE to establish a signaling connection for the UE.

12. The apparatus of claim 8, wherein the instructions are further executable by the processor to:
    perform notification and privacy verification with the UE prior to establishing a signaling connection for the UE.

13. The apparatus of claim 8, wherein the instructions are further executable by the processor to:
    receive a positioning message that provides a downlink positioning message for forwarding to a base station, wherein the downlink positioning message is for a first protocol and the positioning message is for a lower layer protocol than the first protocol;
    forward the positioning message to the base station for performing positioning measurement; and
    receive a base station-generated positioning measurement from the base station.

14. A non-transitory computer readable medium storing code for wireless communication, the code comprising instructions executable by a processor to:

receive, at a mobility management entity (MME), a subscriber location message from a gateway mobile location center (GMLC);

send, by the MME, a location request to an Evolved Serving Mobile Location Center (E-SMLC) based at least in part on receiving the subscriber location message;

assist, by the MME, with a positioning procedure between the E-SMLC and a user equipment (UE) after sending the location request; and receive, at the MME, a location response from the E-SMLC after the positioning procedure, wherein the location response comprises information indicating whether a location estimate included in the location response satisfies a defined Quality of Service (QoS) and information indicating a positioning method used to obtain the location estimate.

15. The non-transitory computer readable medium of claim 14, wherein the instructions for sending the location request are further executable by the processor to:

send the location request during at least one of an emergency attach or an emergency bearer setup.

16. The non-transitory computer readable medium of claim 14, wherein the instructions are further executable by the processor to:

select the E-SMLC based at least in part on receiving a request from the UE for at least one of an emergency access or an emergency bearer, wherein the instructions for sending the location request are further executable by the processor to:

send the location request to the selected E-SMLC.

17. The non-transitory computer readable medium of claim 14, wherein the instructions are further executable by the processor to:

perform a network triggered service request procedure with the UE to establish a signaling connection for the UE.

18. The non-transitory computer readable medium of claim 14, wherein the instructions are further executable by the processor to:

perform notification and privacy verification with the UE prior to establishing a signaling connection for the UE.

19. The non-transitory computer readable medium of claim 14, wherein the instructions are further executable by the processor to:

receive a positioning message that provides a downlink positioning message for forwarding to a base station;

forward the positioning message to the base station for performing positioning measurement; and receive a base station-generated positioning measurement from the base station.

20. The non-transitory computer readable medium of claim 19, wherein the downlink positioning message is for a first protocol and the positioning message is for a lower layer protocol than the first protocol.

* * * * *